Aug. 21, 1962  B. L. SMITH ET AL  3,050,333
AUXILIARY CAR CHAIR
Filed Jan. 19, 1960
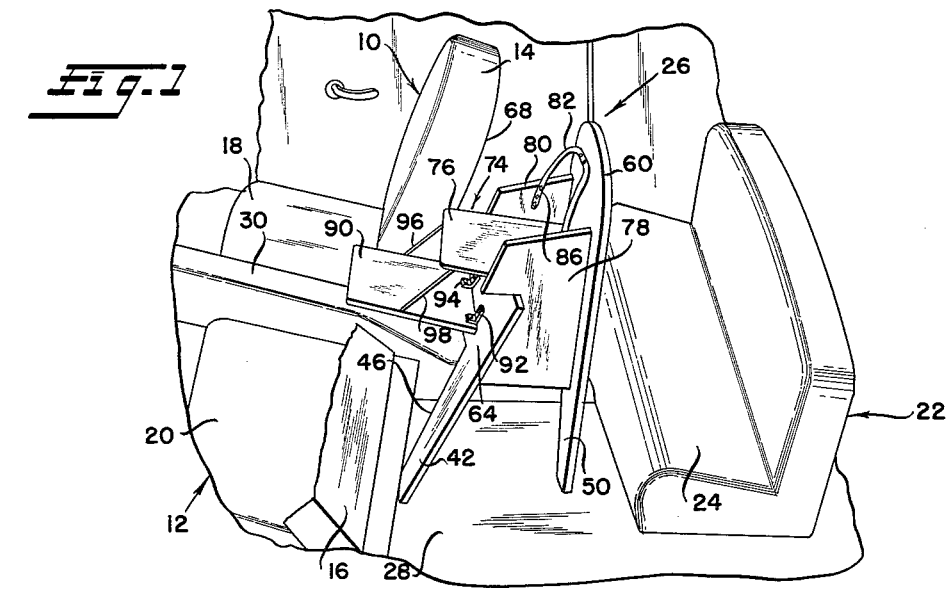
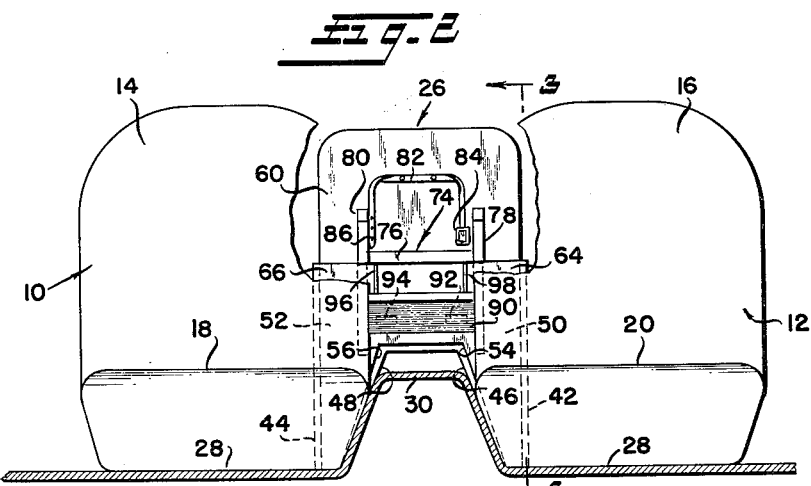
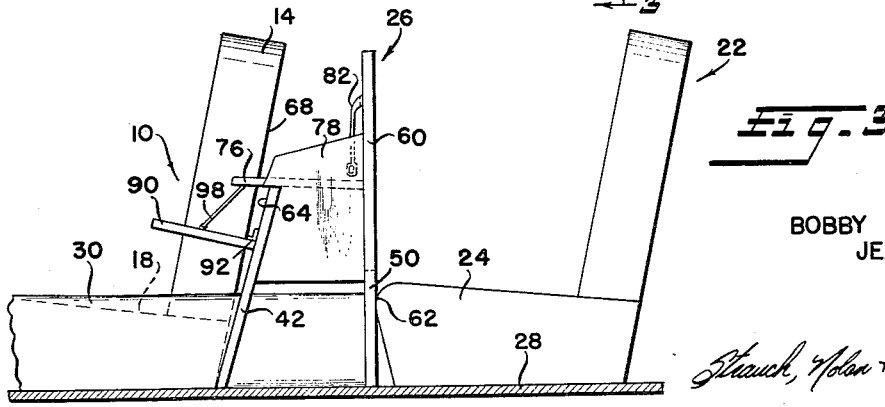
INVENTORS
BOBBY L. SMITH
JEAN SMITH
ATTORNEYS

United States Patent Office 3,050,333
Patented Aug. 21, 1962

3,050,333
AUXILIARY CAR CHAIR
Bobby L. Smith and Jean Smith, both of
737 Midland Ave., Manhattan, Kans.
Filed Jan. 19, 1960, Ser. No. 3,445
4 Claims. (Cl. 296—64)

The invention relates to auxiliary chairs for a child occupant, to be used in an automobile of the type having laterally spaced back rests for the front seat occupants.

Conventional car chairs or seats for small children which hang suspended from the top of the front seat back rest cannot be safely used in certain automobiles presently manufactured, such for example as the four passenger Ford "Thunderbird." A sudden stop may cause the back rest on which the child's chair is suspended to lurch forward and thus injure the child, and because of the wide spacing between the back rests, such prior conventional seats cannot be suspended from any part of the driver's back rest. Further, the rear or back seat is not adapted for safely supporting a child's chair, and for safety reasons some parents have been unwilling to risk driving such automobiles with the child unprotected. This has had the effect of forcing some families to refuse to buy, and even to dispose of a previously owned automobile of this type when small children were in the family.

It is the primary object of the present invention to provide a novel auxiliary car chair for use by children in automobiles of the above-mentioned type wherein prior auxiliary chairs are not adapted for safe use.

Another object is to provide a novel auxiliary car chair which is so constructed as to cooperate with the existing structural features on the automobile and to prevent tipping of the chair in any direction.

A still further object is to provide a novel auxiliary child's chair which is adapted to stand on the floor behind the front seat and in front of the rear seat and which projects into the lateral space between the back rests for the front seat and adjacent the rear surfaces of the front seat back rests to prevent the chair from tipping in any direction without modification of the automobile.

These and other objects of the invention will become apparent from the claims, and from the description and the appended drawings wherein:

FIGURE 1 is a pictorial view of the novel auxiliary chair of the present invention shown in its intended position in an automobile of the type having laterally spaced back rests for the front seat with the back rest at the driver's position folded forward;

FIGURE 2 is a front elevaton view showing the auxiliary chair of the present invention in its intended position with portions of the back rests for the front seats of the automobile broken away; and FIGURE 3 is a side elevation view of the auxiliary chair taken along line 3—3 of FIGURE 2 with the seat at the driver's position removed.

With continued reference to the drawings, the type of vehicle for which the present invention is especially adapted is one where front seats 10 and 12 having back rests 14 and 16 respectively are laterally spaced apart at the center, such as are provided in the Ford "Thunderbird" beginning with the 1958 model year. In this particular automobile, separate seat cushions 18 and 20 are provided, but the present invention is also adapted for use where the front seat cushion is a single member.

In this particular automobile, a rear seat 22 having seat cushion 24 is provided with a space between the seats into which the auxiliary chair 26 of the present invention is adapted to fit. The surface of floor 28 in this particular automobile is provided with an upwardly extending portion 30 which extends from the forward portion of the automobile, between front seat cushions 18 and 20 and rearwardly under rear seat cushion 24 to house the drive shaft or other functional features of the automobile. The central portion of rear seat 24 is accordingly uncomfortable to use particularly for adults and the auxiliary chair of the present invention is adapted to take up the floor space in front of the rear seat 22 only at the central or normally unused portion thereby leaving the rear seat available for the usual two adult occupants.

The auxiliary chair 26 of the present invention basically comprises front legs 42 and 44 which have inside surfaces 46 and 48 respectively that conform to the contour of the side edges of the upwardly extending tunnel portion 30 of automobile floor 28. The rear legs 50 and 52 have inner edges 54 and 56 which are similarly contoured to properly position the chair in the automobile and to prevent the auxiliary chair from sliding laterally or crosswise of the automobile.

Rear legs 50 may be formed of a flat piece of wood, such as plywood, and upper portion 60 may serve at the back rest for the child occupant of chair 26. The portion of rear legs 50 of chair 26 that pass in front of the leading edge of the rear seat cushion 24 are so designed as to contact the leading edge of seat 24 at 62 to thereby prevent the auxiliary chair from sliding rearwardly. The lower ends of front legs 42 and 44 fit beneath the rear of the front automobile seat and together with the rear seat prevent the auxiliary chair 26 from tilting rearwardly. The lower ends of front legs 42 and 44 do not, however, interfere with easy installation or removal of auxiliary chair 26 from the automobile.

Front legs 42 and 44 have, near their upper portion, latterly extending side surfaces 64 and 66 which, as shown in FIGURE 2, extend behind the edges of both of back rests 14 and 16 for the front seat. Surfaces 64 and 66 are preferably quite close to the rear surfaces 68 and 70 of back rests 14 and 16 of the front seats so that in the event of emergency stops, surfaces 64 and 66 of chair 26 can move forward only a small distance, such as three or four inches, to thereby prevent the auxiliary chair 26 from tipping forward.

Seat member 74 is supported by the front and rear legs of chair 26 in any suitable manner, and has a front portion 76 which extends into the lateral space between the back rests 14 and 16 for the front seat to thereby prevent auxiliary chair 26 from tipping sidewise. Side support members 78 and 80 may be of any suitable type to prevent the child from sliding sideways from seat member 74; in this particular embodiment, side support members 78 and 80 may comprise panels of plywood secured to the back member from which rear legs 50 and 52 and back rest 60 are formed and to the member from which front legs 42 and 44 are formed to provide a rigid chair structure. Secured to back rest member 60 is a safety belt 82 having buckle 84 and notched end 86 to prevent the child occupant from sliding forward off seat member 74. A tray or other suitable support member mounted to the front of side support members 78 and 80 could be substituted for belt 82 or used in addition thereto.

Foot rest 90 is preferably provided to keep the child occupant's feet off the upper surface of raised portion 30 since certain accessory control knobs for the automobile are conventionally provided between front seat cushions 18 and 20. Foot rest 90 may be secured to the board which is cut to provide front legs 42 and 44 as by hinges 92 and 94. Foot rest 90 may be held in position by suitable cords at 96 and 98.

While in the illustrated embodiment, the auxiliary chair is described as having been made solely from plywood, it is obvious that a functionally identical auxiliary chair could be constructed of bent metal tubes with seat side and back members all formed of boards covered with a plastic material, preferably which matches the interior of the automobile, using techniques similar to those used in the construction of breakfast room furniture. It is also apparent that with the variations in the dimensions of automobiles, corresponding variations of the dimensions of the auxiliary chair will be necessary in order to adapt the auxiliary chair of the present invention for any particular model of an automobile.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An auxiliary automobile chair for a child in an automobile having a front seat with laterally spaced back rests and a rear seat; said auxiliary chair having front and rear legs resting on the automobile floor behind the front seat and on opposite sides of a raised central portion of the floor; means on the chair extending laterally from the space between the back rests for the front seat and at an elevation above the front seat cushion for abutting a rear surface of the back rest of the front seat to prevent the auxiliary chair from tipping forward; the rear legs extending upwardly in front of and sufficiently close to said rear seat cushion to prevent the auxiliary chair from tipping to the rear; and means including a seat member supported by said front and rear legs having a forwardly projecting portion extending into the lateral space between the spaced back rests for the front seat for abutting said back rests to prevent the auxiliary seat from tipping sidewise.

2. An auxiliary automobile chair for a child in an automobile having a front seat with laterally spaced back rests and a rear seat; said auxiliary chair having front and rear legs resting on the automobile floor behind the front seat and on opposite sides of a raised central portion of the floor; means on the chair extending laterally from the space between the back rests for the front seat and at an elevation above the front seat cushion for abutting a rear surface of the back rest of the front seat to prevent the auxiliary chair from tipping forward; the lower portion of the front legs extending closely adjacent to the lower rear portion of the front seat and the rear legs extending upwardly in front of and sufficiently close to said rear seat cushion to prevent the auxiliary chair from tipping to the rear; means on the auxiliary chair extending into the lateral space between the spaced rests for the front seat and above the front seat cushion to prevent the auxiliary seat from tipping sidewise; and side and back support members carried by said legs.

3. An auxiliary automobile chair for a child in an automobile having a front seat with laterally spaced back rests and a rear seat; said auxiliary chair having front and rear legs for resting on the automobile floor behind the front seat and on opposite sides of a raised central portion of the floor; means on the chair extending laterally from the space between the back rests for the front seat and at an elevation above the front seat cushion for abutting a rear surface of back rests of the front seat to prevent the auxiliary chair from tipping forward; the rear legs extending upwardly in front of and sufficiently close to said rear seat cushion to prevent the auxiliary chair from tipping to the rear; seat, side and back members supported by said front and rear legs; one of said members extending into the lateral space between the space back rests for the front seat for abutting said back rests to prevent the auxiliary chair from tipping sidewise; and means secured to said chair for preventing a child occupant from sliding forward off the seat member.

4. An auxiliary automobile chair for a child in an automobile having a front seat with laterally spaced back rests and a rear seat; said auxiliary chair having front and rear legs for resting on the automobile floor behind the front seat; the legs on opposite sides of a raised central portion of the floor being contoured to generally match the contour of the raised central floor portion; means on the chair extending laterally from the space between the back rests for the front seat and at an elevation above the front seat cushion for abutting a rear surface of the back rests of the front seat to prevent the auxiliary chair from tipping forward; the rear legs extending upwardly in front of and sufficiently close to said rear seat cushion to prevent the auxiliary chair from tipping to the rear; a seat member carried by said front and rear legs having a forwardly projecting portion extending into the lateral space between the spaced back rests for the front seat to prevent the auxiliary seat from tipping sidewise; side and back support members extending upwardly from said seat member; belt means on said chair to prevent a child occupant from sliding forward off the seat member; and a foot rest pivotally mounted to said front legs and above the level of the front seat.

References Cited in the file of this patent

UNITED STATES PATENTS

| | | |
|---|---|---|
| 1,380,678 | Price | June 7, 1921 |
| 2,890,740 | Larson | June 16, 1959 |
| 2,920,687 | Hurley | Jan 12, 1960 |